United States Patent Office 3,595,752
Patented July 27, 1971

3,595,752
TRIAZINOINDOLE COMPOUNDS
C. John Di Cuollo, Drexel Hill, Roland W. Kiney, Berwyn, and Richard C. Stewart, King of Prussia, Pa., assignors to Smith Kline & French Laboratories, Philadelphia, Pa.
No Drawing. Original application Oct. 6, 1966, Ser. No. 584,657, now Patent No. 3,453,276, dated July 1, 1969. Divided and this application Jan. 17, 1969, Ser. No. 817,593
Int. Cl. C12d 1/02
U.S. Cl. 195—51                                                 3 Claims

ABSTRACT OF THE DISCLOSURE

3 - carboxyalkylaminotriazino[5,6 - b]indoles are prepared microbiologically by action of a variety of organisms, preferably *Nocardia rubra* ATCC 19557, on the corresponding 3 - hydroxyalkylaminotriazinoindole. The products have antiviral activity, particularly against rhinoviruses.

---

This is a division of application Ser. No. 584,657 filed Oct. 6, 1966, now U.S. Pat. 3,453,276.

The present invention relates to triazinoindole compounds having antiviral activity. In particular, the invention relates to as-triazino[5,6-b]indoles substituted at the 3-position with a carboxyalkylamino grouping.

The compounds of the invention are represented by the following structural formula:

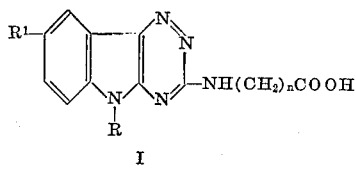

I wherein:
R is lower alkyl of 1–4 carbon atoms or phenylalkyl of 7–9 carbon atoms;
R¹ is hydrogen, methoxy, chloro, or nitro; and
n is a positive integer from 2 to 7.

A preferred group of compounds is represented by Formula I when R¹ is hydrogen and R is methyl.

The present invention also includes the pharmaceutically acceptable acid addition salts of the compounds of Formula I. Among these salts are the hydrochloride, hydrobromide, sulfate, and maleate, all of which are prepared by well-known salt-forming techniques. The invention also includes the alkali metal, ammonium, and simple amine salts of the inventive compounds. These latter salts constitute the form in which the compounds exist when in basic solution and are formed by conventional basification and isolation techniques. Since the compounds of Formula I possess both amine and carboxylic acid functions, they may also exist in a zwitterionic form in which one of the nitrogen atoms bears a positive charge and the carboxylic acid function exists as its carboxylate anion. The invention is intended to comprehend the compounds as represented by Formula I or by the dipolar zwitterionic species, as well as in the form of their acid and basic salts and hydrates.

The compounds of Formula I are prepared either microbiologically or chemically. When a microbiological method of preparation is utilized, the starting materials are the primary alcohols corresponding to the product carboxylic acids. These alcohols are represented by Formula II, where R, R¹ and n are as defined in Formula I.

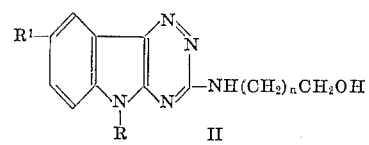

II

These compounds are described in Belgian Pat. 653,089 or are prepared by methods described therein. The preferred method of preparing these starting materials is by condensing an appropriately substituted 3-mercaptotriazinoindole with a hydroxyalkylamine.

Many species of microorganisms convert an alcohol of Formula II to a carboxylic acid of Formula I. Among these are many representative species of fungi, bacteria and actinomycetes, including members of the genera Scopulariopsis, Nocardia, Streptomyces, Geotrichum, Pseudomonas, Penicillium, Beauvaria, Aspergillus, Pachybasium, Cunninghamella, Protaminobacter, Corynebacterium, Arthrobacter, Bacillus, and many others. The organism of choice is *Nocardia rubra* (ATCC 19557), since the above product is formed in higher yield with few (if any) competing side reactions. However, the process is not limited to this species.

These microorganisms are cultivated in liquid media, such as nutrient broth, yeast extract broth, Trypticase Soy Broth, soybean meal broth, or peanut meal broth. The media should contain sources of available carbon, nitrogen, and minerals. In our experiments, best results were obtained using the glucose-ammonia-soybean medium shown in Example 1. Carbohydrates, such as starches, dextrins, and sugars, including hexoses and pentoses, may be used to furnish the energy and carbon requirements of the microorganisms. Other sources of carbon may also be used, for example, citric acid and its salts, sodium acetate, alcohols or fatty acids. Sources of nitrogen in assimilable form can be made available by soluble or insoluble vegetable or animal protein and protein derivatives such as soybean meal, casein, meat extracts, corn steep liquor, yeast extract and peptones. Amino acids or ammonium salts can also be used. Minerals naturally present in the above carbon and nitrogen sources are usually sufficient to satisfy the requirements of the microorganisms. A sterile air supply must be maintained during the fermentation. This can be accomplished by exposing a large surface of the growth medium to the atmosphere with constant agitation, or alternatively by the use of submerged aeration devices. Aeration at a rate of about 0.5 to 2.0 volumes of air per volume of growth medium per minute produces satisfactory results.

During the fermentation the temperature should be maintained within a range of about 23° C. to 32° C., preferably from about 25° C. to 30° C.

Optimum growth of the microorganisms is achieved when the pH of the fermentation is maintained within a range of pH 6.0 to 6.8. This may be accomplished by the intermittent addition of mineral acids or bases to adjust the pH or also by the incorporation of buffering agents in the fermentation medium. Buffering agents such as calcium carbonate or potassium dihydrogen phosphate may be used. In the case of *N. rubra* the transformation appears to take place most rapidly after maximum growth has terminated, the vegetative hyphae have fragmented, and the reaction of the medium is maintained in the range pH 7.5–8.0.

The substrate alcohol may be added to the culture as a finely divided solid or in solution in a suitable solvent, such as ethanol or methanol. We prefer to convert the substrate compound to its hydrochloride form, which is more readily soluble in the lower alcohols and water. The addition of the substrate to the microbial culture should be made under aseptic conditions. The incubation and aeration of the culture is continued in order to bring about the transformation of the substrate. Alternatively the substrate may be added to the fermentation medium at the time the medium is first inoculated with the culture of microorganism.

The fermentation or biotransformation process is continued until the maximum amount of product has accumulated. This usually occurs within a time period of about 4–48 hours, and is most easily determined by periodic analysis of the fermentation system. This analysis can best be carried out chromatographically, as this method gives a quick and accurate representation of the types and relative concentrations of the compounds present. We have used both paper and thin layer chromatography for analysis. The actual methods used are cited in the examples below. We have found that product yields can be increased by continued feeding of additional supplies of substrate to the fragmented culture, provided that the transformation culture is also supplemented with glucose and the reaction is controlled at pH 7.5–8.0.

When the transformation has progressed to its maximum stage (as shown by chromatographic analysis), the fermentation is terminated and the compounds, both untransformed substrate and the transformation products, are recovered. This is most commonly done by extraction of the aqueous fermentation broth with organic solvents which are immiscible with water, n-butanol, or other immiscible solvents of like polarity, are most satisfactorily used to extract the product carboxylic acid. Alternatively the carboxylic acid can be converted directly to its methyl or other lower alkyl ester by addition of the appropriate alkanol to an acidic mixture of the carboxylic acid, and the ester is then readily extracted from the aqueous broth with chloroform. The whole fermentation broth, including microbial cells and aqueous supernatant fluid, can be extracted, or alternatively the cellular mass of the microorganism can first be separated from the aqueous supernatant fluid by centrifugation or filtration. In the latter case extraction of compounds from the microbial cellular mass is best accomplished by the use of methanol or other lower alkanol. By extracting cells and aqueous supernatant broth separately the formation of troublesome emulsions is often avoided.

The solvent extracts rich in product are pooled and residual traces of water are removed with suitable drying agents, such as anhydrous sodium sulfate. The dried solvent extract is then concentrated in vacuo to dryness at temperatures generally not exceeding 60° C. A brownish-colored residue results which contains the compounds of interest as well as many solvent extractable miscellaneous compounds produced as a result of microbial metabolism. It is necessary to remove these contaminating materials in order to obtain the product in a purified state.

In many cases the product is present in high enough concentration that it can be readily crystallized from a methanol or other lower alkanol solution of this dried residue after preliminary decolorization with activated charcoal. In this case, however, the crystalline precipitate may contain a mixture of the free acid and its lower alkyl ester. If the ester has been extracted, the residue containing ester is redissolved in a small volume of hot $CHCl_3$ and precipitated with a large excess of hexane. The ester is then recrystallized from $CHCl_3$-MeOH. The ester is readily hydrolyzed by aqueous acid at 120° for a few minutes, and the free acid then crystallized from appropriate solvents. The lower alkyl esters, being readily hydrolyzed to the corresponding carboxylic acids, are useful for the preparation of the acids and are therefore part of the present invention.

If a mixture of products results from the fermentation process, or if a significant amount of untransformed substrate remains, more elaborate purification procedures are required. We have used column chromatography for these purifications. The methods used consist in general of the gradient elution of the products from a column of adsorbent material (such as silica or cellulose) by mixtures of judiciously chosen organic solvents. The presence of the separated compounds in the solvent fractions obtained after column chromatography is most easily determined by paper or thin layer chromatographic analysis of aliquot samples. The appropriate fractions containing purified compounds are pooled, concentrated in vacuo, and the purified compounds are finally crystallized from appropriate solvent mixtures. The following example illustrates a typical experiment for the microbial transformation of 3-(3-hydroxypropylamino)-5-methyl-as-triazino[5,6 - b]indole to 3-(2-carboxyethylamino)-5-methyl-as - triazino[5,6-b]indole, the recovery, isolation and purification of the product.

EXAMPLE 1

3-(2-carboxyethylamino)-5-methyl-as-triazino[5,6-b]indole

Nutrient agar slants of *Nocardia rubra* ATCC 19557 were used to prepare 50 ml. broth cultures in a sterile medium of the following composition:

Medium SBM–6

| | G./liter |
|---|---|
| 1.0% Soybean meal (Archer-Daniels-Midland) | 10 |
| 1.0 Cerelose | 10 |
| 1.0 $(NH_4)_2SO_4$ | 10 |
| 0.01 $MgSO_4 \cdot 7H_2O$ | 0.1 |
| 0.01 $KH_2PO_4$ | 0.1 |
| 0.05 NaCl | 0.5 |
| Tap water, q.s., 1000 ml. | |
| pH 6.0–6.5 without adjustment, then add 0.5% $CaCO_3$ | 5 |

The flasks were incubated at 25° with continual shaking on a rotary shaker describing a 2-inch circle at 200 r.p.m. After 24–48 hours incubation, just before microbial growth had reached its maximum, the above cultures were used to inoculate larger volume of the same medium, using at least 10% (v./v.) inoculum. This scale-up of the microbial culture was continued until a 50-liter culture was obtained.

The 50-liter culture was used for the actual transformation of substrate to product. This was carried out in a 130-liter "Fermacell" batch fermentator (New Brunswick Scientific Co.) under the following conditions:

Aeration: 1.8 c.f.m. (1.0 v.v.m.); Head pressure: 10 p.s.i.g.
Agitation: 300 r.p.m.; Temperature: 30°

Foaming was controlled by the intermittent addition of sterile UCON oil LB625 (Union Carbide Company) as required.

After 24 hours mycelial growth had reached its maximum state, the vegetative hyphae had begun to fragment, and the microorganism had begun to synthesize a light orange pigment (which is characteristic of this strain *N. rubra*).

50 g. of 3-(3-hydroxypropylamino)-5-methyl-as-triazino[5,6-b]indole (as the hydrochloride in 200 ml. ethanol) was added aseptically, together with an additional 500 g. of sterile glucose in solution, aeration was increased to 3.6 c.f.m. (2.0 v.v.m.), agitation was increased to 400 r.p.m. and the reaction (which had dropped to pH 6.0) was raised to and maintained at pH 7.6 with NaOH. The progress of the transformation was followed by chromatographic analysis, as follows:

Samples were taken from the fermentor aseptically, and 1.4 ml. aliquot portions were extracted with 0.5 ml. n-butanol. The butanol extracts were spotted on Whatman No. 1 paper and developed (ascending) in a mixture of n-propanol; conc. NH₄OH: water (6:3:1 or 8:1:1 v./v./v.). The dried chromatograms were examined under ultraviolet light. The substrate and product appeared as yellow fluorescent spots.

Chromatographic analysis showed that all of the substrate was metabolised within 8 hr., and the carboxyethylamino compound was the only product detectable under these conditions.

The transformation was terminated by chilling the culture to 0°, the reaction was adjusted to pH 2 with HCl, and the cells were separated from the broth by centrifugation on a Sharples Supercentrifuge. The mass of cells showed only traces of product, so were discarded. The aqueous broth supernatant solution, containing high concentrations of the desired product, was adjusted to pH 3.5–4.0 carefully with NH₄OH, and a precipitate of yellow crystals of crude product was collected. The remaining broth was extracted three times with n-butanol. These extracts were pooled and concentrated to dryness in vacuo at a temperature less than 40°.

The dried residue was dissolved in methanol, acidified with HCl, filtered, decolorized with activated charcoal, and adjusted to pH 3.5–4.0 with NH₄OH. A fine precipitate of pale yellow needles was obtained, which proved to be a mixture of the free acid with traces of its methyl ester.

The pooled batches of crude product acid crystals plus the traces of the methyl ester present were dissolved in to make a concentrated solution in aqueous HCl. This was heated at 120° for 15 minutes in the autoclave, cooled, and adjusted to pH 3.5–4.0 with NH₄OH. The pale yellow needles which precipitated were filtered off and washed with water. The yellow filtrate, containing some of the product as the ammonium salt, was acidified with acetic acid, and another precipitate of yellow needles was obtained. The excess acetic acid was removed by washing the crystals with ether or CHCl₃ in which the product was insoluble. The washed crystals were recovered by vacuum filtration and dried overnight in vacuo at 60°, M.P. 247–250° with decomposition. Paper chromatography showed a single, yellow fluorescing spot, characteristic of the acid product, at R_F 0.45 in PrOH:NH₄OH:H₂O (8:1:1).

EXAMPLE 2

By utilizing the following starting materials as substrates and carrying out the procedures described in the previous example, the following products are obtained, respectively.

Starting materials 3-(3-hydroxypropylamino)-8-chloro-5-methyl-as-triazino[5,6-b]indole
3-(4-hydroxybutylamino)-5-methyl-as-triazino[5,6-b]indole
3-(3-hydroxypropylamino)-5-ethyl-as-triazino[5,6-b]indole
3-(6-hydroxyhexylamino)-5-methyl-as-triazino[5,6-b]indole Products 3-(2-carboxyethylamino)-8-chloro-5-methyl-as-triazino[5,6-b]indole
3-(3-carboxypropylamino)-5-methyl-as-triazino[5,6-b]indole
3-(2-carboxyethylamino)-5-ethyl-as-triazino[5,6-b]indole
3-(5-carboxypentylamino)-5-methyl-as-triazino[5,6-b]indole When a chemical method of synthesis of the compounds of Formula I is employed, the starting materials are the 3-hydroxy-as-triazinoindoles of Formula III, where R and R¹ are as defined in Formula I.

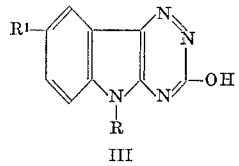

III

These compounds are prepared as described in Belgian Pat. 653,089, by treating the corresponding mercapto compounds, also described therein, with hydrogen peroxide or chloroacetic acid. The hydroxy compound is then converted to a 3-chloro compound, preferably by reaction with phosphorus oxychloride and N,N-dimethylaniline. The chloro compound is then condensed with a cyanoalkylamine to give a 3-cyanoalkylamino triazinoindole, and the cyano group is hydrolyzed by acid, preferably a mixture of hydrochloric and acetic acids, to give the product carboxylic acid.

The following examples illustrate the manner of preparing the compounds of the invention by chemical means, but are not to be considered as limiting the scope of the compounds preparable thereby.

EXAMPLE 3

3-(2-carboxyethylamino)-5-methyl-as-triazino[5,6-b]indole

A mixture of 1.0 g. of 3-hydroxy-5-methyl-as-triazino[5,6-b]indole, 4.0 ml. of POCl₃, and 2.0 ml. of N,N-dimethylaniline is heated under reflux for 15 minutes. The dark brown mixture is cooled slightly and poured onto 75–100 g. of cracked ice. The crude 3-chloro-5-methyl-as-triazino[5,6-b]indole is then filtered off and recrystallized from ethanol; M.P. 219–221°.

A mixture of 10.3 g. of this 3-chloro compound, 95 ml. of 3-aminopropionitrile, and 190 ml. of chloroform is heated under reflux on a steam bath for 18–20 hours. The chloroform is removed in vacuo and the residue is heated with 10 volumes of water. The aqueous mixture is further evaporated to remove the last traces of chloroform, whereupon the solid which precipitates is removed by suction filtration. The resulting solid 3-(2-cyanoethylamino) - 5 - methyl-as-triazino[5,6-b]indole is purified by recrystallization from ethanol to give a light brown to yellow granular product, M.P. 200–201.5°.

A stirred solution of 2.5 g. of this cyano compound, 25 ml. of 20% HCl, and 25 ml. of glacial acetic acid is heated under reflux for 18 hours. The reaction mixture is then evaporated to dryness on a rotary evaporator. The residual solid is dissolved in excess 5% NaHCO₃ solution, and the solution is clarified by filtration through a Super-Cel mat. The pH of the filtrate is adjusted from 8.5 to 4.5 by adding glacial acetic acid and the precipitated fully hydrated solid is filtered off and dried at 60° in a vacuum oven. This compound, M.P. 252–253°, is a one-eighth hydrated form of the carboxyethylamine product. Recrystallization from dimethyl formamide gives the anhydrous product, M.P. 248–249°.

EXAMPLE 4

By starting with the following starting materials, and performing the chlorination, condensation, and hydrolysis reactions as described in Example 3, the following products are obtained, respectively.

Starting materials 3-hydroxy-5-benzyl-as-triazino[5,6-b]indole
3-hydroxy-5-methyl-as-triazino[5,6-b]indole
3-hydroxy-8-chloro-5-methyl-as-triazino [5,6-b]indole
3-hydroxy-8-nitro-5-methyl-as-triazino [5,6-b]indole 3-hydroxy-8-methoxy-5-propyl-as-triazino
[5,6-b]indole Cyanoalkylamine 3-aminopropionitrile
5-aminovaleronitrile
3-aminopropionitrile
8-aminooctanonitrile
3-aminopropionitrile Products 3-(2-carboxyethylamino)-5-benzyl-as-triazino
[5,6-b]indole
3-(4-carboxybutylamino)-5-methyl-as-triazino
[5,6-b]indole
3-(2-carboxyethylamino)-8-chloro-5-methyl-as-triazino[5,6-b]indole
3-(7-carboxyheptylamino)-8-nitro-5-methyl-as-triazino[5,6-b]indole
3-(2-carboxyethylamino)-8-methoxy-5-propyl-as-triazino[5,6-b]indole The compounds of this invention are antiviral agents. They are active particularly against rhinoviruses. They are formulated for use by methods well known to the skilled pharmaceutical chemist. They are intended to be administered orally in the form of a tablet or capsule or intranasally as a 0.5–10% suspension or solution. The tablets and capsules may include such common pharmaceutical excipients as sodium carboxymethyl cellulose, terra alba, sucrose, starch, lactose, and magnesium stearate. They are intended to be administered in doses of 0.5–5 g./day, preferably 1–2 g./day.

EXAMPLE 5

3-(2-carboxyethylamino)-5-methyl-as-triazino[5,6-b]indole

The microbial transformation was carried out essentially as in Example 1. The following procedure was then used to isolate and purify the product. This procedure has the advantage that it is better suited to large-scale fermentation recovery processes with fewer losses in product yield.

The acidified (HCl, pH 1–2) aqueous broth supernatant fluid was concentrated in vacuo at T<50° to 1/10–1/50 its volume. This yielded a dark brown syrup from which precipitated a brown sludge of salts and other solids. The syrup and sludge were separated by decantation and treated separately with MeOH. In the presence of high concentrations of MeOH and HCl, the acid product orginally present was rapidly converted to its methyl ester. The MeOH solutions containing the methyl ester (and many impurities) were concentrated in vacuo to a dark brown, oily residue. This was dissolved in a minimal volume of boiling $CHCl_3$, and then poured into a large excess (10–20 volumes) of n-hexane. The methyl ester of the acid product precipitated as an amorphous mustard-yellow powder, which was filtered off. Recrystallization from $CHCl_3$-MeOH containing a few drops $NH_4OH$ yielded fine, pale yellow plates, M.P. 189–190°, $R_F$ 0.95 in PrOH: $NH_4OH$: $H_2O$ (8:1:1).

The methyl ester of the desired carboxylic acid product was hydrolyzed by boiling with aqueous HCl at 100°. The cooled hydrolysate, a deep yellow, a clear solution, was adjusted to pH 6–7 with $NH_4OH$, and some unhydrolyzed methyl ester crystallized within a few minutes and was filtered off. The clear yellow solution of the ammonium salt of the carboxylic acid was reacidified with acetic acid to pH 3.0–3.5, and within a few minutes fine yellow needles precipitated. These were filtered, washed free of residual salts with water, and dried overnight in vacuo at 60°. The product melted at 247–250° with decomposition.

EXAMPLE 6

The microbial transformation was carried out essentially as in Example 1 except that the substrate was added [1] as a finely crushed powder suspended in a little water to give a final concentration of substrate of 1 mg./ml. The transformation culture (50 ml.) contained, therefore, a total of 50 mg. substrate.

The transformation was complete within 36 hours, and chromatographic analysis showed that no substrate or other detectable products were present.

The product was isolated essentially as described in Example 5 to give a final yield of 35.6 mg. crystalline free acid (71.2% overall yield, direct weight basis).

[1] To a 50 ml. culture of *N. rubra* ATCC 19557 in medium SBN–6.

We claim:
1. A process for preparing a compound of the formula

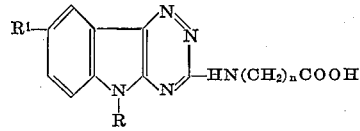

comprising subjecting a compound of the formula:

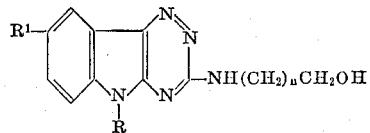

where R is lower alkyl of 1–4 carbon atoms or phenylalkyl of 7–9 carbon atoms; $R^1$ is hydrogen, methoxy, chloro, or nitro; and $n$ is a positive interger from 2 to 7; or a pharmaceutically acceptable acid addition salt or an alkali metal or ammonium salt thereof, to the action of *Nocardia rubra* ATCC 19557 in an aqueous, aerated nutrient medium.

2. A process as claimed in claim 1, where R is methyl and $R^1$ is hydrogen.

3. A process as claimed in claim 2, where $n$ is 2.

References Cited

UNITED STATES PATENTS 3,505,341    4/1970    Elslager et al. _____ 195—51

ALVIN E. TANENHOLTZ, Primary Examiner